Figure 1:
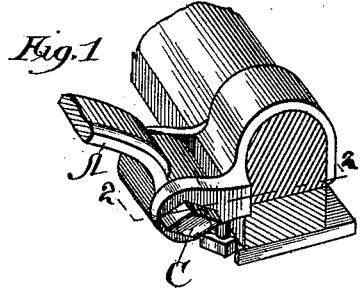

(No Model.)

D. S. BROWN.
THILL COUPLING.

No. 465,918. Patented Dec. 29, 1891.

Witnesses:
Charles O. Shervey
C. P. Smith

Inventor:
Dillon S. Brown
By Wiles, Greene & Bitwo
Attys.

THE NORRIS PETERS CO., PHOTO-LITHO., WASHINGTON, D. C.

UNITED STATES PATENT OFFICE.

DILLON S. BROWN, OF GENOA, ILLINOIS.

THILL-COUPLING.

SPECIFICATION forming part of Letters Patent No. 465,918, dated December 29, 1891.

Application filed July 23, 1891. Serial No. 400,433. (No model.)

*To all whom it may concern:*

Be it known that I, DILLON S. BROWN, a citizen of the United States of America, residing at Genoa, in the county of De Kalb and State of Illinois, have invented certain new and useful Improvements in Thill-Couplings, of which the following is a specification.

This invention relates to certain improvements designed to prevent the rattling of the thill-eyes in the clips to which they are secured. Its particular object is to enable a washer of spongy elastic material to be applied between the thill-eye and the bolt under great compression, so that it will form a perfectly tight joint even after considerable wear has taken place.

To such end it consists in the use of a washer which, when placed in the thill-eye, occupies a much greater portion of the same than will be given to it when the bolt is in place, and also in the provision of a bolt sufficiently pointed to enter the small hole still left within said washer, and means upon the interior of the eye to prevent the washer from rotating therein, so that after the bolt is once started it can be screwed through the washer, compressing the same as it advances without displacing it, as would be the result if the bolt were driven through. I prefer to make the washer of a flat piece of leather small enough, so that when rolled up it can be inserted in the eye, and to provide within the eye a rib against which the ends of the piece of leather may abut, and thus prevent the washer from turning with the bolt. This preferred construction is illustrated in the drawings, wherein—

Figure 2:
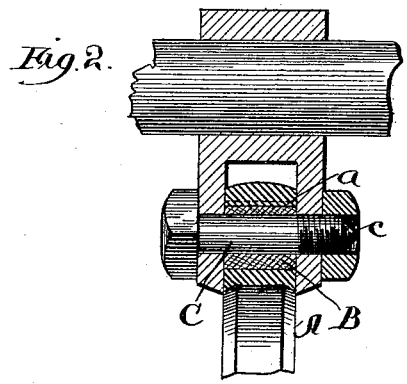
Figure 3:
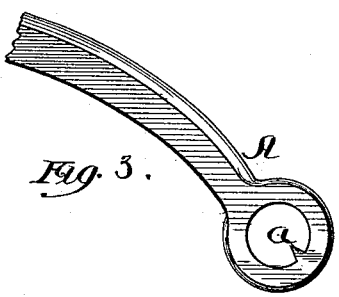
Figure 5:
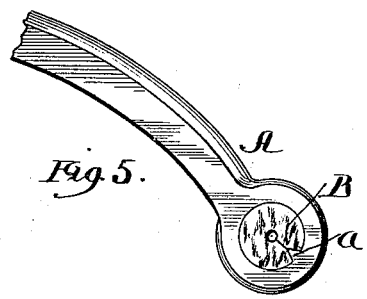
Figure 6:
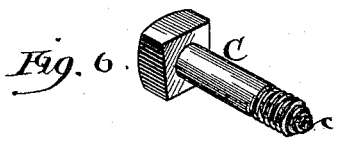
Figure 4:
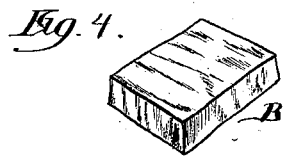

Figure 1 is a perspective of the entire coupling; Fig. 2, a section on line 2 2 of Fig. 1; Fig. 3, a side view of the thill-eye without the washer; Fig. 4, a perspective of the washer itself; Fig. 5, a side view of the thill-eye with the washer in place, and Fig. 6 a perspective of the bolt.

The thill-eye is lettered A, and has an internal rib $a$ extending longitudinally of the hole. The washer represented at B is a flat rectangular piece of leather of sufficient length and breadth to fit tightly within the eye when rolled up and of sufficient thickness that when it is forced into the eye, with its ends abutting against the rib $a$, it shall nearly fill the opening. In fact, no harm would be done if it completely filled the same, and the joint would be all the tighter. The bolt C is slightly sharpened at the point, as seen at $c$, to assist its initial insertion into the washer.

In putting the parts together the washer is first inserted, as seen in Fig. 5, the eye then placed in the clip, the bolt inserted in the latter and forced part way into the washer, and then by turning the bolt it will push itself through the washer without disturbing it, although as it advances it places the washer under great compression, because of the reduced thickness of the same after the bolt is in place.

The chief advantage of my improvement is of course the ease with which washers may be replaced. Whenever a washer becomes too loose, one can be readily cut from any old scrap of leather and put in place of the old one in the manner above described. This is obviously a great advance over all devices which require a washer manufactured for this particular purpose to be used.

I claim as new and desire to secure by Letters Patent—

1. In a thill-coupling, the combination, with a clip, of a pole-eye having an internal rib, a washer formed of a rectangular piece of leather or similar material placed in the thill-eye, so that one of its ends may abut against the rib, and a bolt adapted to enter said washer and push itself through the same by turning therein, substantially as described.

2. The combination, with a suitable clip, of an eye having an internal rib, a washer constructed of a rectangular piece of leather, or similar material, inserted within the eye, so that one of its ends may abut against said rib, and a pointed bolt adapted to enter said washer, substantially as described.

DILLON S. BROWN.

Witnesses:
CHARLES A. BROWN,
D. W. HARTMAN.